Dec. 2, 1924.  1,517,519

J. STILLIANS

POWER TRANSMISSION DEVICE

Filed July 12, 1922

John Stillians
INVENTOR

BY Victor J. Evans
ATTORNEY

WITNESSES

Patented Dec. 2, 1924.

1,517,519

UNITED STATES PATENT OFFICE.

JOHN STILLIANS, OF BEAUMONT, TEXAS.

POWER-TRANSMISSION DEVICE.

Application filed July 12, 1922. Serial No. 574,360.

*To all whom it may concern:*

Be it known that I, JOHN STILLIANS, a citizen of the United States, residing at Beaumont, in the county of Jefferson and State of Texas, have invented new and useful Improvements in Power-Transmission Devices, of which the following is a specification.

This invention relates to power transmission devices and has for its object the provision of a novel ratchet and gear mechanism for converting reciprocatory movement of a power beam into continuous rotary motion of a power take off shaft.

An important object is the provision of a device of this character which will be simple and inexpensive in manufacture, positive in action, efficient and durable in service and a general improvement in the art.

With the above and other objects and advantages in view the invention consists in the details of construction to be hereinafter more fully described and claimed and illustrated in the accompanying drawings, in which:

Figure 1:
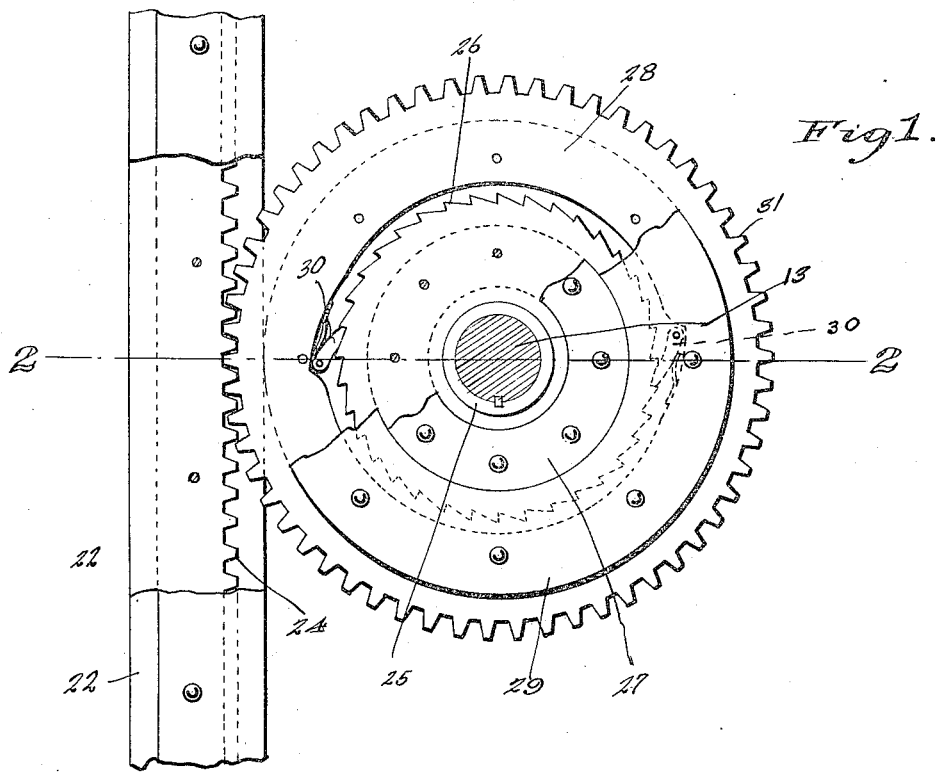
Figure 1 is an elevation partly broken away and partly in section illustrating my invention.
Figure 2:
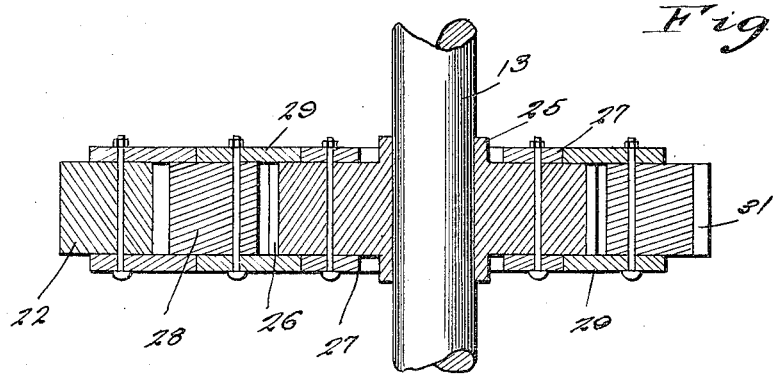
Figure 2 is a section on the line 2—2 of Figure 1.

Referring more particularly to the drawings the numeral 13 represents a power shaft and 22 indicates a reciprocatory beam. On the shaft is a power wheel including a hub 25 keyed to the shaft and having its periphery formed with ratchet teeth 26. Secured upon opposite sides of this hub are rings 27 which terminate inwardly of the ratchet teeth. Disposed concentrically of the hub is a rim 28 upon opposite sides of which are secured rings 29 which bear against the outer peripheries of the rings 27 for maintaining the proper concentric relation. Carried by the rim member 28 at the inner periphery thereof are spring pressed pawls 30 which engage the ratchet teeth 26 for driving the hub member when the rim member is rotated in one direction. The outer periphery of the rim member is formed with gear teeth 31 meshing with rack teeth 24 on the power beam 22.

In the operation, it will be seen that when the power beam 22 is moved longitudinally by any means whatsoever, the engagement of the teeth 24 with the teeth 31 of the rim member 28 of the wheel will cause rotation of the rim in a counterclockwise direction. When the power beam is subsequently removed in the reverse direction the pawls 30 engaging the ratchet teeth 26 will cause corresponding rotation of the hub 25 and shaft 13. In this way it is obvious that the reciprocatory movement of the beam is converted into continuous rotary movement of the shaft.

While I have shown and described the preferred embodiment of my invention it is of course to be understood that I reserve the right to make such changes in the form, construction and arrangement of parts as will not depart from the spirit of the invention or the scope of the subjoined claim.

Having thus described my invention I claim:

In a power transmission device, a power shaft, a power wheel mounted on said shaft and including a hub portion and a ring gear having an intermittent grip device with the hub portion, a reciprocable power beam provided with a rack engaging the respective ring gear, bearing rings secured upon the sides of the hub portion, other bearing rings secured upon the sides of the ring gear and engaging said first named bearing rings for maintaining the concentric relation of the ring gear with respect to the hub, and plates on the sides of the power beam and engaging the last named bearing rings.

In testimony whereof I affix my signature.

JOHN STILLIANS.